United States Patent [19]

Heep et al.

[11] Patent Number: 4,784,298

[45] Date of Patent: Nov. 15, 1988

[54] APPARATUS FOR FEEDING BULK MATERIAL

[75] Inventors: Dieter Heep, Bergatreute; Paul Vogel, Ravensburg; Manfred Frey, Aulendorf-Zollenreute, all of Fed. Rep. of Germany

[73] Assignee: Waeschle Maschinenfabrik GmbH, Ravensburg, Fed. Rep. of Germany

[21] Appl. No.: 71,651

[22] Filed: Jul. 8, 1987

[30] Foreign Application Priority Data

Jul. 11, 1986 [DE] Fed. Rep. of Germany ....... 3623454

[51] Int. Cl.⁴ ............................................. G01F 11/10
[52] U.S. Cl. .................... 222/350; 222/368; 277/81 P
[58] Field of Search ............... 222/345, 350, 349, 370, 222/344, 368; 277/81 P, 129, 128, 126; 418/127, 134, 147

[56] References Cited

U.S. PATENT DOCUMENTS 2,684,186  7/1954  Mattos ............................... 222/368
3,656,518  4/1972  Aronson ............................ 222/345
4,228,732 10/1980  Aonuma et al. .................... 222/368

Primary Examiner—H. Grant Skaggs
Assistant Examiner—Kenneth Noland
Attorney, Agent, or Firm—Henry M. Feiereisen

[57] ABSTRACT

An apparatus for feeding bulk material includes a housing which accommodates a rotor arranged between an inlet port and an outlet port of the housing and having a plurality of radially extending vanes. The vanes are fixed on a shaft and provided with sealing strips for sealing the vanes against the housing. For compensating occurring wear and maintaining the sealing action, the sealing strips are corrected by an adjusting bar with two spaced conical sufaces which cooperate with push rods having one end lying against the conical surfaces and another end in force-locking connection with the sealing strips.

15 Claims, 6 Drawing Sheets

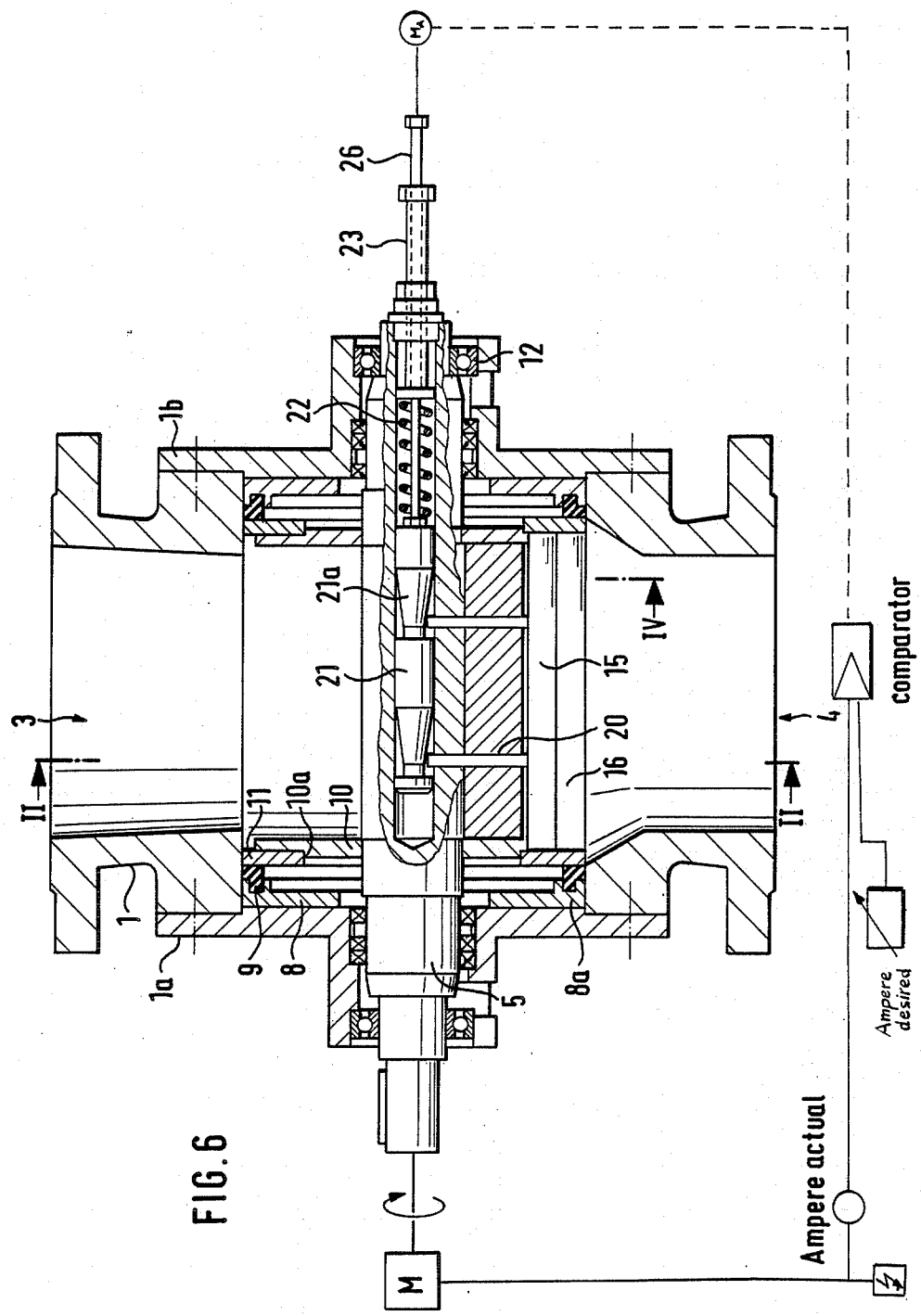

APPARATUS FOR FEEDING BULK MATERIAL

BACKGROUND OF THE INVENTION

The present invention refers to an apparatus for feeding bulk material, in particular to a cellular wheel sluice or rotary feeder of the type including a housing provided with a top inlet and a bottom outlet and accommodating a rotor which includes a plurality of radial vanes supported on a horizontal shaft and including sealing strips which extend parallel to the shaft and abut the inner wall surface of the housing.

In such a feeding apparatus, it is desired to keep the amount of leakage air as low as possible. There are three locations where air may leak, that is the axial gap between the housing and the rotor, the radial gap between the housing and the rotor, and the scooped air volume of the rotor compartments. Thus, the amount of leakage air depends at given gap widths and given capacity of the compartments on the pressure drop between inlet and outlet as well as on the rotational speed of the rotor.

While scooped air losses have to be accepted, the amount of leakage air through the axial gap can be reduced by specially designed axial face seals. Further, the use of sealing strips extending along or in the end faces of the vanes were proposed for reducing the amount of leakage air escaping through the radial gaps. Such sealing strips, however, wear out relative quickly especially during transport of abrasive bulk material. Therefore, the device must be shut down within short periods and partly dismantled in order to adjust or replace the sealing strips.

The U.S. Pat. No. 3,556,355 describes a rotary feeding apparatus of this kind in which the sealing strips are automatically adjusted in order to compensate wear thereof. The vanes of the rotor are provided at their end faces with grooves which accommodate sealing strips guided for radial displacement and made of e.g. polytetrafluoroethylene. The grooves are connected via bores with a central passageway in the shaft of the rotor. Fluid under pressure is introduced through the passageway and the bores to the grooves so that the sealing strips are maintained in contact with the inner surface wall of the housing by a constant, pressure-dependent force.

This prior art has, however, some drawbacks which prevented its use in practice. There are considerable technical difficulties to guide the sealing strips sufficiently tight within the grooves especially at the corners of the vanes i.e. at the junction of the radial end face with the axial end face of a vane. Further, the degree of wear of the sealing strips cannot be monitored or controlled from outside. Also, an uneven wear over the length of the sealing strips and/or varying friction along the portion of the sealing strips arranged in the grooves of the vanes result in tilting or canting of the sealing strips.

SUMMARY OF THE INVENTION

It is thus an object of the present invention to provide an improved feeding apparatus for bulk material obviating the afore-stated drawbacks.

This object and others which will become apparent hereinafter are attained in accordance with the present invention by providing the vanes of the rotor with a sealing strip which for maintaining its sealing action is corrected by a central adjusting device including an adjusting bar movable within the shaft of the rotor and having at least two conical surfaces spaced from each other in axial direction for cooperation with push rods whose one end abuts the conical surfaces and whose other end is connected in force-locking manner with the sealing strip.

The sealing strips are accommodated in grooves of the vanes of the rotor. To seal the sealing strips in these grooves can easily be attained e.g. by a circumferential O-ring as the correction or adjustment of the sealing strips is accomplished by purely mechanical means. A further advantage of the present invention is the fact that no additional pressure fluid is required which may contaminate the bulk material and increases the amount of leakage air - in the case the pressure fluid is compressed air. The sealing strips are retained exactly parallel to the inner wall of the housing and are pressed thereagainst at a defined force so that a continuous sealing action is upheld with no tilting or canting of the sealing strips.

For attaining an automatic correction, the adjusting bar is loaded by a compression spring whose one end acts on the adjusting bar and whose other end abuts against a fixed hollow screw. The displacement of the adjusting bar during correction of the sealing strips is preferably utilized for determining the degree of wear which thus can be monitored from outside. For that purpose, the hollow screw extends beyond the shaft toward the outside and guides a traversing display bar whose one end is connected to the adjusting bar and whose other end projects beyond the hollow screw and is provided with a scale which indicates the degree of wear.

Thus, it is not required to conduct a routine replacement of the sealing strips e.g. after operating the feeding apparatus for a certain period, or to check for wear by partly dismantling the rotor. Moreover, by allowing the condition of the sealing strips to be monitored from outside, damages caused by worn out and unnoticed sealing strips are prevented.

Advantageously, the hollow screw is provided with a head against which the display bar may run with a stop member so that the axial displacement of the adjusting bar is limited. Suitably, the display bar may cooperate with a safety switch which after reaching a wear limit shuts down the rotary feeding apparatus.

According to a further feature of the invention, the sealing strips are loaded in radial direction toward the shaft by springs so that e.g. essentially worn out sealing strips are prevented from slipping out of the vanes. Moreover, by withdrawing the adjusting bar, the sealing strips are completely received within the grooves of the vanes at their radial end sections so that the dismantling and installation of the rotor in the housing is considerably facilitated.

According to yet another feature of the present invention, each sealing strip is in interlocking claw-like connection with a support which are acted upon by the push rods. This feature improves the guidance of the sealing strips and facilitates the replacement of worn out sealing strips.

BRIEF DESCRIPTION OF THE DRAWING

The above and other objects, features and advantages of the present invention will now be described in more detail with reference to the accompanying drawing in which.

DESCRIPTION OF PREFERRED EMBODIMENTS

Figure 1:
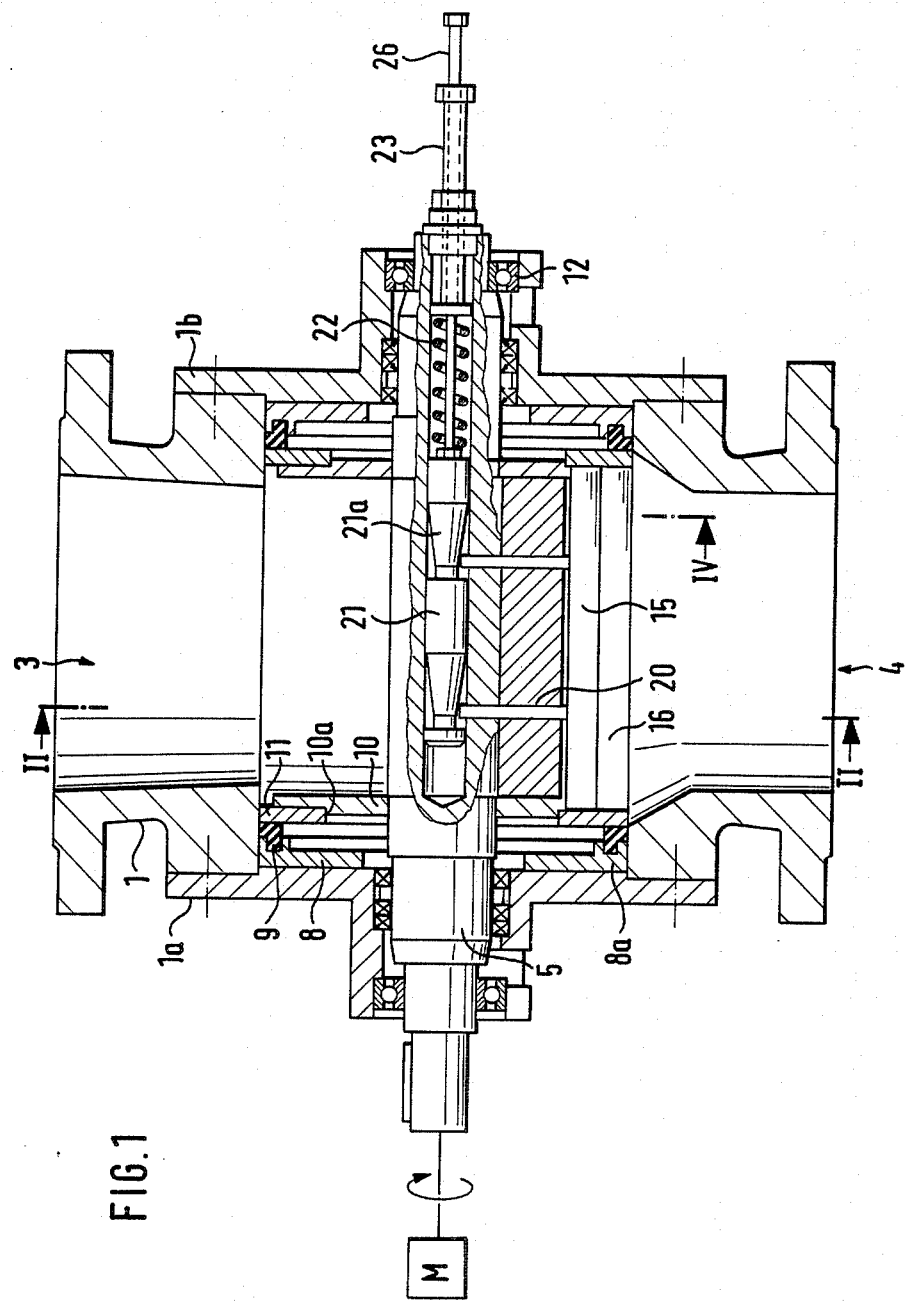
FIG. 1 is a longitudinal section of one embodiment of a feeding apparatus for bulk material in accordance with the invention.
Figure 2:
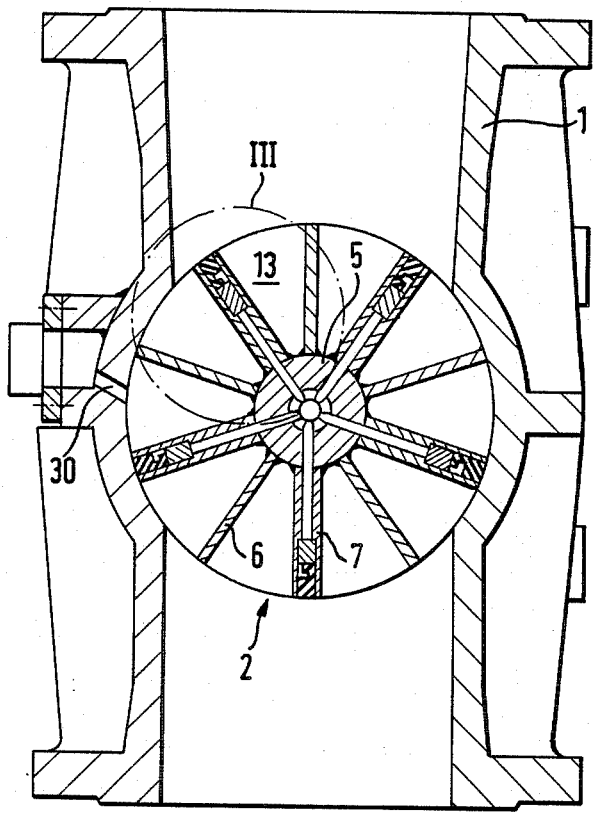
FIG. 2 is a cross section taken along the line II—II in FIG. 1.

Referring to the drawing, and in particular to FIGS. 1 and 2, there is shown one embodiment of an apparatus for feeding bulk material in form of a cellular wheel sluice or rotary feeder which includes a housing 1 having an inlet port 3 and an outlet port 4. A cellular rotor 2 is mounted within the housing 1 on a shaft 5 which is rotatably journaled in suitable bearings 12 in respective side covers 1a, 1b on opposite sides of the housing 1 and is driven by a suitable motor M shown only schematically. The rotor 2 is sealed in the housing 1 at both axial ends by a pressure plate 8 which is arranged at the inner surface of the pertaining side covers 1a, 1b and is provided with a bifurcated flange 8a for retaining a peripheral sealing ring 9. The sealing ring 9 is sandwiched between the pressure plate 8 and a thrust collar 11 which sits on a shoulder 10a of a laterally arranged disk 10 and is preferably bolted thereto. The disk 10 is connected to the shaft 5 in non-rotational manner e.g. through welding.

The rotor 2 includes a plurality of vanes 6 and 7 which are alternatingly disposed and extend radially from the shaft 5 to define compartments 13 therebetween for transporting material from the inlet port 3 to the outlet port 4.

The vanes 6 are preferably metallic plates whose radial length is dimensioned such that a narrow gap (not shown in the drawing) is defined between the radial end face of the vanes 6 and the inner wall surface of the housing 1.

Figure 3:
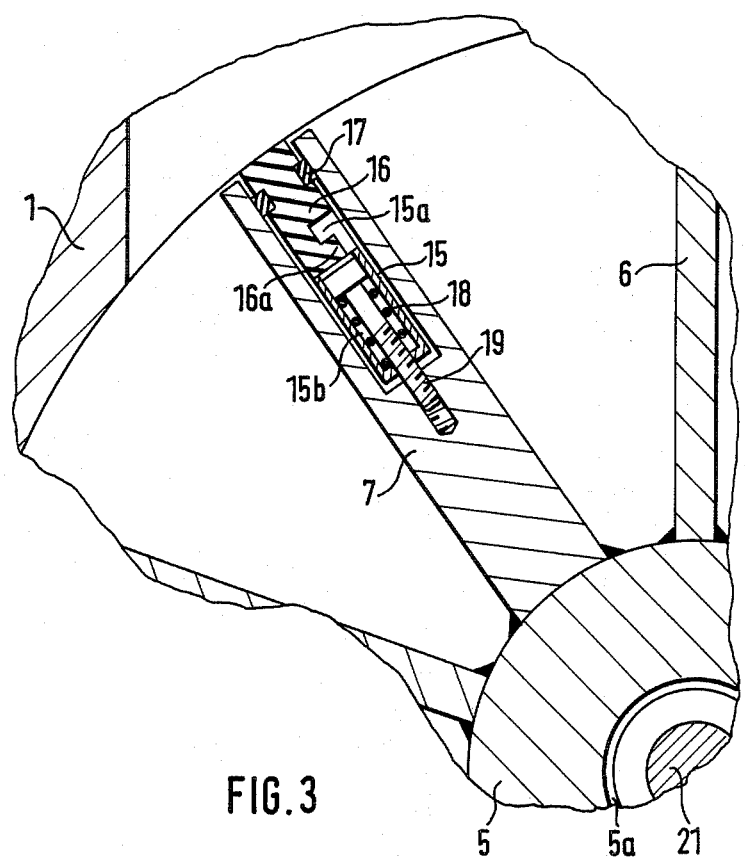
FIG. 3 is a partial cross sectional view on an enlarged scale according to section III in FIG. 2.
Figure 4:
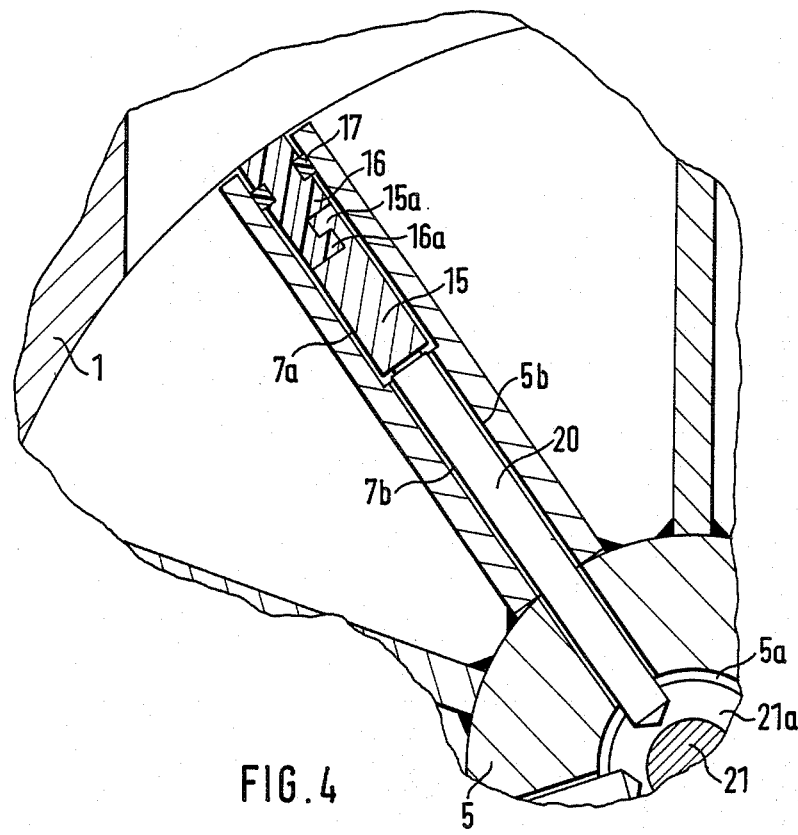
FIG. 4 is a partial cross sectional view on an enlarged scale similar to FIG. 3 and taken along the line IV in FIG. 1.

Turning now in particular to FIGS. 3 and 4, there is shown in detail the structure of a respective one of the vanes 7 equipped with suitable sealing means. Each vane 7 of the rotor 2 is provided with a groove 7a which extends in axial direction of the vane 7 and is open at its axial end facing the inner surface of the housing 1. At its other axial end, the groove 7a extends into a bore 7b of narrower cross section the purpose of which will be described furtherbelow. Accommodated in the groove 7a is a support 15 which is provided with a flange 15a of inverted L-shape at its axial end facing the inner surface of the housing 1, and a sealing strip or sealing bar 16 which is provided at its axial end facing the support 15 with a flange 16a of L-shape which is in engagement with the flange 15a. Thus, the support 15 and the sealing strip 16 are interlocked with each other in form-fitting manner via a claw-like connection.

The sealing strip 16 is preferably made of a heat resistant self-lubricating plastic material as e.g. polytetrafluoroethylene. Other material with similar properties may certainly be used as well, if such is requested. In order to prevent a penetration from dusty bulk material, the sealing strip 16 is sealed within the groove 7a by a circumferential O-ring 17.

Figure 5:
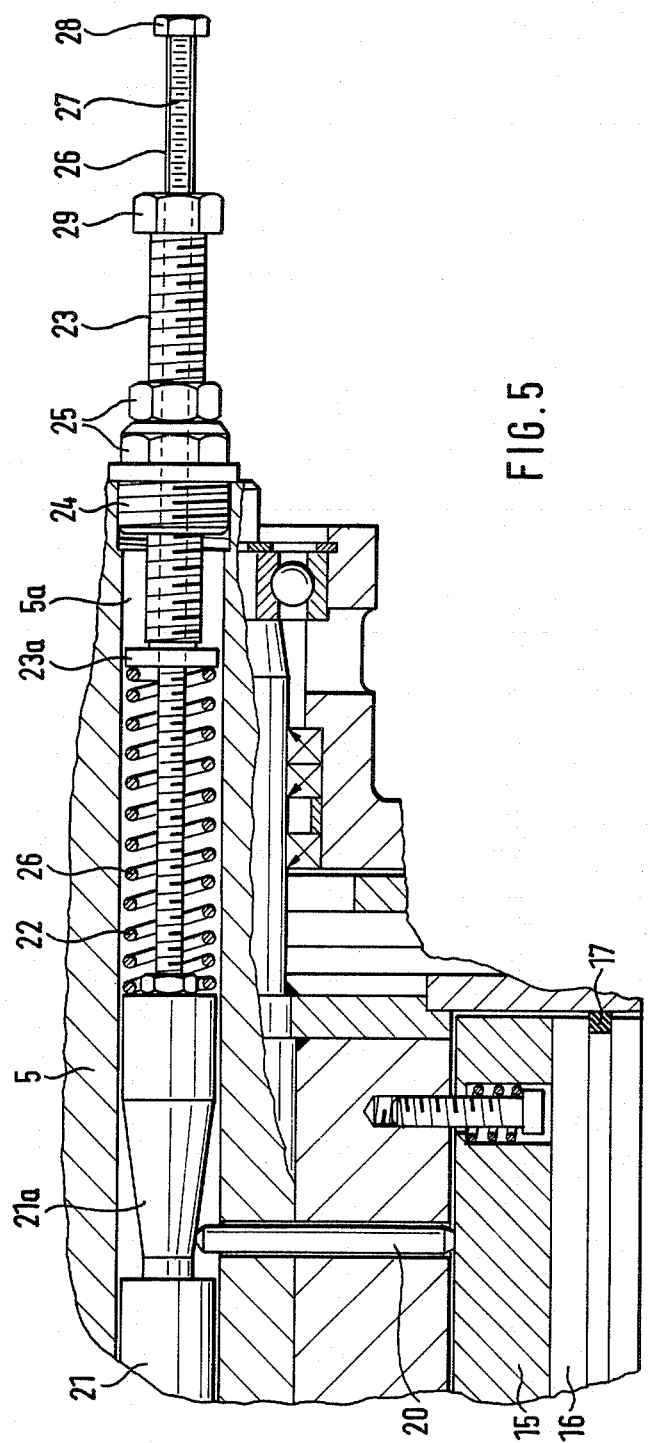
FIG. 5 is a partial cross sectional view of the apparatus of FIG. 1 on an enlarged scale illustrating the adjusting mechanism in more detail.

The form-fitting interlocking connection between the sealing strip 16 and the support 15 although secure and tight still allows a replacement of the sealing strip 16 in an easy fashion. As best seen in FIGS. 1 and 5, a replacement of the sealing strip 16 is attained by removing e.g. the side cover 1a and by dismantling the thrust collar 11 so that the respective sealing strip 16 can be replaced via the thus accessible groove 7a.

Suitably, the inner width of the inlet port 3 and of the outlet port 4 is shorter by a small amount than the length of the sealing strip 16 when measured in direction to the shaft 5. This design guarantees an accurate guidance of the sealing strips 16 along their lateral edges when passing the inlet port 3 and the outlet port 4.

It will be appreciated, however, that such a guidance may not be required when loading the sealing strips 16 in radial direction toward the shaft 5 by suitable spring means which would prevent the sealing strips 16 from becoming disengaged from the vanes 7. Accordingly, as shown in FIGS. 3 and 5, the support 15 includes several boreholes 15b in which a coil or compression spring 18 is arranged. The spring 18 is prestressed between the base of the support 15 and the head of a bolt 19 which traverses the support 15 and is screwed into the pertaining vane 7. During rotation of the rotor 2 and advance of the sealing strips 16 past the inlet port 3 and outlet port 4, the springs 18 will retain the sealings strips 16 in place and prevent a disengagement thereof.

As shown in particular in FIG. 4 which illustrates in cross sectional view one of the vanes 7, the support 15 is prevented from resting against the base of groove 7a by two suitably spaced push rods 20. Each of the push rods 20 traverses the bore 7b of the vane 7 and an aligned bore 5b in the shaft 5 and projects into an axially extending central bore 5a of the shaft 5. With their other outer end remote to the bore 5a, the push rods 20 act against the support 15 in a manner which will now be described.

Arranged within the central bore 5a is a control or adjusting bar 21 which is provided with two identical axially spaced conical surfaces 21a which cooperate with the inner axial ends of the push rods 20. Consequently, a displacement of the control rod 21 in axial direction thereof causes a parallel shift of the push rods 20 so that the supports 15 and consequently the sealing strips 16 of the vanes 7 are moved in radial direction axis parallel toward the inner surface of the housing 1.

In the nonlimiting example of the present invention, the adjustment of the sealing strips 16 is attained automatically in accordance with progressing wear. The adjusting bar 21 is biased by a coil spring 22 which extends in the central bore 5a between the adjusting bar 21 and an end plate 23a of a hollow screw 23. The hollow screw 23 projects beyond the shaft 5 toward the outside and allows an adjustment of prestress of the spring 22. A threaded bush 24 supports the hollow screw 13 which is stationarily fixed via suitable locking fasteners 25 like lock nuts or jam nuts. Traversing the hollow screw 23 and projecting therefrom with its one axial end is a display rod 26 which is connected to the adjusting bar 21 with its other axial end and includes a scale 27 for indicating the degree of axial displacement of the adjusting bar 21 and/or the degree of wear of the sealing strips 16. Arranged at the one end extending beyond the hollow screw 23, the display rod 26 is provided with a head-like stop member 28 which limits the correction range of the adjusting bar 21 by running against the head 29 of the hollow screw 23.

During operation, a wear of the sealing strips 16 will cause the adjusting bar 21 to move toward the left under the action of the spring 26. This in turn will cause the push rods 20 to run along the conical surfaces 21a and force the sealing strips 16 in radial direction via the supports 15. Thence, due to the force-locking connection between the push bars 20 and the sealing strips 16 the tight arrangement of the sealing strips 16 against the inner surface of the housing 1 is maintained and occurring wear of the sealing strips 16 is compensated.

Simultaneous with the displacement of the adjusting bar 21, the display rod 26 is shifted as well and moves relative to the hollow screw 23. The user is then able to read on the scale 27 the degree of wear. When the displacement of the adjusting bar 21 has reached a point at which the stop member 28 of the display rod 26 hits the head of the hollow screw 23, the user is informed that the sealing strips 26 are worn out and should be replaced. Advantageously, this stop mechanism may be operatively connected with a safety switch (not shown) which shuts down the feeding apparatus when the wear limit has been reached.

Although not shown in the drawing, the displacement of the adjusting bar 21 in axial direction thereof may certainly be attained also by other suitable means without departing from the spirit of the present invention. For instance, the adjusting mechanism may be made dependent on a third variable e.g. the current consumption of the driving motor M of the feeding apparatus for motorically controlling the adjusting bar 21 e.g. via its motor $M_4$ (FIG. 6). As the current consumption of the driving motor M at constant revolution is primarily dependent on the friction caused by the conveyed bulk material between the radial ends of the vanes 7 and the inner surface of the housing 1, an adjustment of the sealing strips 16 in dependence on the frictional force is attained.

It will also be appreciated that the alternating arrangement of the vanes 6 and 7 is only made by way of example and should thus not be limited thereto. Such alternating arrangement is preferred in particular in those cases in which the rotor 2 is provided with at least 10 vanes. Then, a seal in radial direction is already obtained when in each position of the rotor 2 at least one vane 7 provided with a sealing strip 16 seals against the housing 1 between the outlet port 4 and the discharge port for leakage air which is usually arranged before the inlet port 2 in rotational direction of the rotor 2 and is shown in FIG. 2 and designated by reference numeral 30. As the circumferential arc between outlet port 4 and discharge port 30 is smaller than the opposing circumferential arc between inlet port 3 and outlet port 4, it is guaranteed that at least one vane 7 is always arranged in the area between the outlet port 4 and the inlet port 3.

While the invention has been illustrated and described as embodied in an Apparatus for Feeding Bulk material, it is not intended to be limited to the details shown since various modifications and structural changes may be made without departing in any way from the spirit of the present invention.

What is claimed as new and desired to be protected by Letters Patent is set forth in the appended claims.

1. Apparatus for feeding bulk material; comprising:
   a housing provided with inlet means and outlet means;
   a rotor accommodated within said housing and having a shaft and a plurality of radially extending vanes supported on said shaft to define compartments for transporting the bulk material from said inlet means to said outlet means;
   sealing means disposable in said vanes for sealing said vanes toward said housing, said sealing means including a sealing strip and a support which is interlocked with said sealing strip and provided with at least one radial bore;
   adjusting means acting on said sealing means for maintaining the sealing action at said housing and including an adjusting bar which is guided within said shaft for axial displacement thereof and has at least two conical surfaces spaced from each other in axial direction, and push rods provided in said vanes and spaced from each other in such a manner that their one end abuts said conical surfaces and their other end bears against said sealing means; and
   spring means urging said sealing means radially in direction toward said shaft to prevent disengagement of said sealing means from said vanes during rotation of said rotor, said spring means including a screw traversing said radial bore of said support and being threadably engaged in said vanes, and a compression spring extending in said radial bore with their one end bearing against said support and their other end supported by said screw.

2. Apparatus as defined in claim 1 wherein said shaft is provided with an axial bore, said adjusting bar extending in said bore.

3. Apparatus as defined in claim 1 wherein said vanes are provided with bores extending between said sealing means and said conical surfaces, said push rods being guided with said bores.

4. Apparatus as defined in claim 1 wherein said support and said sealing strip are interlocked to each other in a claw-like manner, said push bars acting with their other end against said support.

5. Apparatus as defined in claim 4 wherein said support is provided with a flange of inverted L-shape, and said sealing strip is provided with a flange of L-shape which engages with said flange of said support to attain said interlocking claw-like connection.

6. Apparatus as defined in claim 1 wherein every second one of said vanes is provided with said sealing means.

7. Apparatus as defined in claim 1 wherein said adjusting means further includes a compression spring loading said adjusting bar in axial direction thereof and having a prestress controllable from outside.

8. Apparatus as defined in claim 1, and further comprising driving means for rotating said shaft, said adjusting means being operatively connected with said driving means in dependence on a third variable so as to allow motoric control of the displacement of said adjusting bar in axial direction thereof.

9. Apparatus as defined in claim 8 wherein said third variable is the current consumption of said driving means.

10. Apparatus as defined in claim 7, and further display means cooperating with said adjusting bar for indicating wear of said sealing means.

11. Apparatus as defined in claim 10 wherein said display means includes a hollow screw having one end supporting said compression spring remote to said adjusting bar and extending beyond said shaft toward the outside, and a display rod guided within said hollow screw and having one end connected to said adjusting bar and another end projecting toward the outside beyond said hollow screw and provided with a scale for indicating the degree of wear.

12. Apparatus as defined in claim 11 wherein said display rod is provided with a stop member at its axial end remote to said adjusting bar, said stop member running against said hollow screw for restricting the displacement of said adjusting bar in axial direction thereof.

13. Apparatus as defined in claim 1 wherein said inlet means includes an inlet port defined by an inner diameter, and said outlet means includes an outlet port defined by an inner diameter, said inner diameters of said inlet port and said outlet port being slightly smaller than the length of said sealing means.

14. Apparatus for feeding bulk material; comprising:
a housing provided with inlet means and outlet means;
a rotor accommodated within said housing and having a shaft and a plurality of radially extending vanes supported on said shaft to define compartments for transporting the bulk material from said inlet means to said outlet means;
sealing means disposable in said vanes for sealing said vanes toward said housing, said sealing means including a sealing strip and a support connected to said sealing strip and provided with at least one radial bore;
adjusting means acting on said sealing means for maintaining the sealing action at said housing; and
spring means urging said sealing means radially in direction toward said shaft to prevent disengagement of said sealing means from said vaned during rotation of said rotor, said spring means including a screw traversing said radial bore of said support and being threadably engaged in said vanes, and a compression spring extending in said radial bore with their one end bearing against said support and their other end supported by said screw.

15. A rotary sluice for feeding bulk material; comprising
a housing provided with a top inlet port and a bottom outlet port;
a rotor accommodated within said housing and having a horizontal shaft and a plurality of radially extending vanes supported on said shaft to define compartments for transporting the bulk material in defined quantities from said inlet port to said outlet port;
sealing means disposable in said vanes for sealing said vanes toward said housing, said sealing means including a sealing strip and a support which is interlocked with said sealing strip and provided with at least one radial bore;
adjusting means acting on said sealing means for maintaining the sealing action at said housing and including an adjusting bar which is guided within an axial bore of said shaft for axial displacement thereof and has at least one conical surfaces spaced from each other in axial direction, and push rods guided in bores of said vanes in such a manner that their one end abuts said conical surfaces and their other end bears against said sealing means, and
spring means urging said sealing means radially in direction toward said shaft to prevent disengagement of said sealing means from said vanes during rotation of said rotor, said spring means including a screw traversing said radial bore of said support and being threadably engaged in said vanes, and a compression spring extending in said radial bore with their one end bearing against said support and their other end supported by said screw.

* * * * *

UNITED STATES PATENT AND TRADEMARK OFFICE
CERTIFICATE OF CORRECTION

PATENT NO.    : 4,784,298
DATED         : November 15, 1988
INVENTOR(S)   : DIETER HEEP et al.

It is certified that error appears in the above-identified patent and that said Letters Patent is hereby corrected as shown below:

COLUMN 3, LINE 10, delete "and";
COLUMN 3, LINE 13, after "detail" add --; and FIG. 6 is a longitudinal section of the apparatus of FIG. 1, with the adjusting bar being motorically controlled --.
COLUMN 5, LINE 51, change first occurrence of "2" to -- 3 --.

Signed and Sealed this

Eighteenth Day of April, 1989

Attest:

DONALD J. QUIGG

*Attesting Officer*     *Commissioner of Patents and Trademarks*